(12) United States Patent
Riguera Arias et al.

(10) Patent No.: US 11,282,021 B2
(45) Date of Patent: Mar. 22, 2022

(54) SYSTEM AND METHOD FOR IMPLEMENTING A FEDERATED FORECASTING FRAMEWORK

(71) Applicant: JPMorgan Chase Bank, N.A., New York, NY (US)

(72) Inventors: Ricardo Riguera Arias, Brooklyn, NY (US); Fernando Cela Diaz, Brooklyn, NY (US); Chris Ferraro, Stamford, CT (US); Ashish Das, New York, NY (US); Anupam Sharma, Union City, NJ (US); Surya Chavali, Glasgow (GB); Bharat Patel, Hillsborough, NJ (US); Kenneth C. Wood, Scottsdale, AZ (US); Veronica Mejia Bustamante, New York, NY (US); Reuben Mathew, Lewisville, TX (US); Nikhil Mirakhur, Jackson Heights, NY (US); Boyu Wu, New York, NY (US); Chengchen Qin, Weehawken, NJ (US); Ravi K. Govindaraju, Franklin Park, NJ (US); Yufeng Ding, Forest Hills, NY (US); Stephen Koch, Teddington (GB); Saurabh Shivpuri, Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 246 days.

(21) Appl. No.: 16/138,281

(22) Filed: Sep. 21, 2018

(65) Prior Publication Data

US 2019/0095840 A1 Mar. 28, 2019

Related U.S. Application Data

(60) Provisional application No. 62/561,967, filed on Sep. 22, 2017.

(51) Int. Cl.
*G06Q 10/06* (2012.01)
*G06F 9/54* (2006.01)
(Continued)

(52) U.S. Cl.
CPC ....... *G06Q 10/06375* (2013.01); *G06F 9/541* (2013.01); *G06F 16/211* (2019.01);
(Continued)

(58) Field of Classification Search
CPC ............ G06Q 10/06375; G06F 16/907; G06F 16/901; G06F 16/90335; G06F 16/211;
(Continued)

(56) References Cited

U.S. PATENT DOCUMENTS 7,822,630 B1 * 10/2010 Smyth ................... G06Q 10/04
705/7.31
9,800,675 B2 * 10/2017 Bullotta .................. H04L 67/28
(Continued)

OTHER PUBLICATIONS

Bocciarelli, Paolo, and Andrea D'Ambrogio, "Chapter 14—A Model-Driven Method for the Design-Time Performance Analysis of Service-Oriented Software Systems." Modeling and Simulation of Computer Networks and Systems. Elsevier Inc, 2015. pp. 425-450. (Year: 2015).*

*Primary Examiner* — Charles Guiliano
*Assistant Examiner* — Letoria G Knight
(74) *Attorney, Agent, or Firm* — Hunton Andrews Kurth LLP (57) ABSTRACT

A Foundational Framework ("the Framework") may refer to an apparatus that connects a multiplicity of potentially very complex components, each of which produce different types of information related to financial forecast, while maintaining a distributed and federated model to allow high autonomy to each component. The innovative Framework provides a unified operation of lifecycle of every component
(Continued)

and allows the production of unlimited types of forecasts of different dimensions and for different purposes using a common tool that is responsible of coordinating and running the sequence of components for the user's needs.

20 Claims, 9 Drawing Sheets

(51) Int. Cl.
| | |
|---|---|
| *H04L 12/803* | (2013.01) |
| *H04L 29/06* | (2006.01) |
| *G06F 16/21* | (2019.01) |
| *G06F 16/901* | (2019.01) |
| *G06F 16/907* | (2019.01) |
| *G06F 16/903* | (2019.01) |
| *H04L 29/08* | (2006.01) |
| *H04L 47/125* | (2022.01) |
| *H04L 67/1097* | (2022.01) |

(52) U.S. Cl.
CPC .......... *G06F 16/901* (2019.01); *G06F 16/907* (2019.01); *G06F 16/90335* (2019.01); *H04L 47/125* (2013.01); *H04L 63/10* (2013.01); *H04L 63/102* (2013.01); *H04L 67/1097* (2013.01)

(58) Field of Classification Search
CPC ....... G06F 9/541; H04L 47/125; H04L 63/10; H04L 63/102; H04L 67/1097
See application file for complete search history.

(56) References Cited

U.S. PATENT DOCUMENTS

| | | | |
|---|---|---|---|
| 10,489,865 B1* | 11/2019 | Dillard | G06Q 40/12 |
| 2004/0003132 A1* | 1/2004 | Stanley | G06F 16/20 |
| | | | 719/316 |
| 2006/0161403 A1* | 7/2006 | Jiang | G06F 17/18 |
| | | | 703/2 |
| 2014/0278754 A1* | 9/2014 | Cronin | G06F 16/2453 |
| | | | 705/7.29 |
| 2014/0324540 A1* | 10/2014 | Doshi | G06Q 30/0202 |
| | | | 705/7.31 |
| 2017/0006135 A1* | 1/2017 | Siebel | G06F 9/5072 |
| 2017/0140040 A1* | 5/2017 | Gottemukkala | G06Q 10/067 |
| 2017/0316324 A1* | 11/2017 | Barrett | G06Q 30/0201 |
| 2017/0323089 A1* | 11/2017 | Duggal | G06F 21/126 |
| 2018/0060738 A1* | 3/2018 | Achin | G06Q 10/04 |
| 2018/0349797 A1* | 12/2018 | Garvey | G06F 9/5077 |

* cited by examiner

☆ Scenario  410    [Baseline]
⊙ Choose a scenario to run the mode

☆ Products  412   [Product 2, Product 3... ▽]
⊙ Choose products to include in the portfolio ☆ Report level  414    ○ Portfolio  ● Product
⊙ Choose the granularity level of the report ☆ Start date  416    [2017/01/01]
⊙ Choose the start date of the forecast ☆ Number of forecast weeks  418    [52]
⊙ Enter the length of forecast ☆ Apply portfolio adjustment  420    [☒]

☆ Output file name  422    [output.csv]
⊙ Please enter the name of the output file

Figure 4

| ☆ Single Select Example 510 | Option 1 ▽ |
| --- | --- |
| | --Select-- |
| | Option 1 |
| | Option 2 |
| | Option 3 |

Select (multiple selections)

| ☆ Multiple Select Example 512 | Option 2, Option 3, Option 5 ▽ |
| --- | --- |
| | --Select-- |
| | ☐ Option 1 |
| | ☑ Option 2 |
| | ☑ Option 3 |
| | ☐ Option 4 |
| | ☑ Option 5 |

Checkbox

| ☆ Checkbox Example 514 | |
| --- | --- |

Date Input 516

| ☆ Date Selection Example 518 | 2017-01-01 |
| --- | --- |
| | < January 2017 > |
| | Su Mo Tu We Th Fr Sa |
| | [1] 2 3 4 5 6 7 |
| | 8 9 10 11 12 13 14 |
| | 15 16 17 18 19 20 21 |
| | 22 23 24 25 26 27 28 |
| | 29 30 31 |

Text input 520

| ☆ Text Input Example | |
| --- | --- |

Numeric input 522

| ☆ Number Input Example | 52 |
| --- | --- |

Radio button 524

| ☆ Radio Input Example | ● Option 1   ○ Option 2 |
| --- | --- |

Figure 5

Conditional Input based on select Input

| Portfolio 610 | Portfolio 1 ▽ |
| ⊙ Choose a portfolio | |
| Portfolio 1 Principle 612 | 1000 |

| Portfolio 620 | Portfolio 2 ▽ |
| ⊙ Choose a portfolio | |
| Portfolio 1 Principle 622 | 2000 |

Conditional Input based on radio button

| Adjustment 630 | ● Apply rate adjustment  ○ No |
| Adjustment 632 | |
| Adjustment 634 | ○ Apply rate adjustment  ● No |

Figure 6

Files input  710

| Adjustment file | /BAU201603/STUDENT/STUDENT_LOAN_CALC/misc_input/Fee_... ▽ |
|---|---|
| ⊙ Select the adjustment file for the run | --Select-- |
| | /BAU201603/STUDENT/STUDENT_LOAN_CALC/misc_input/Fee_... |
| | /BAU201603/STUDENT/STUDENT_LOAN_CALC/misc_input/Rate... |

Run input  712

| ☆ History runs | --Select-- ▽ |
|---|---|
| ⊙ Select the RUN ID of a history run to be included | --Select-- |
| | Test run of Student loan 2016-12-22 (DEV_CB_CONS_PA_CALC... |

Underlying configuration  714

```
'adjustment_file': {
   'sort_key': 100,
   'required': False,
   'type': 'XX_ds_file',
   'label': 'Adjustment file',
   'description': 'Select the adjustment file for the run',
   'multiple': False,
   'ds_locations': ['XXcalculator'],
   'ds_data_types': [ 'XXmisc_input'],
   'ds_file_extensions': [ ],
   'ds_attributes': {'filetype': 'adjustment_file'},
   'ds_filename_YYY': ' '
},
'run_id': {
   'sort_key': 200,
   'label': "History runs",
   "description": "Select the RUN ID of a history run to be included",
   'type': 'XX_forecast',
   'required': True,
   'multiple': False,
   'XX_calculators': [ 'DEV_XX_YYYY_ZZ_CALC'],
},
```

SYSTEM AND METHOD FOR IMPLEMENTING A FEDERATED FORECASTING FRAMEWORK

CROSS REFERENCE TO RELATED APPLICATIONS

This application claims priority to U.S. Provisional Application No. 62/561,967, filed Sep. 22, 2017, the contents of which are incorporated herein in its entirety.

FIELD OF THE INVENTION

The invention relates generally to a system and method for implementing a federated forecasting framework.

BACKGROUND OF THE INVENTION

Companies need to produce forecasts for a variety of reasons including regulatory requirements, internal planning, resolution and recovery and product design. As part of regular company activity, multiple forecasts are produced for different lines of business, domains, forecasting horizons and also with different parameterizations and assumptions. Oftentimes, different parts of the forecast are produced by distinct groups in the firm using various methods ranging from simple calculations to very complex statistical models. In addition, such forecasts are further subject to varying constraints including delivery cycles, languages, input data, environments, technology platforms or systems, and result formats. Because components are created and managed by divergent groups using specific tools and platforms, a distributed environment will include components running in disparate systems managed and operated by distinct teams. Due to the fragmented nature of the environment, reporting and analysis of the forecasts are currently made with ad-hoc tools and methods that each group then applies to their own parts. Accordingly, current systems result in inefficiencies, duplicative efforts and wasted resources.

These and other drawbacks exist.

SUMMARY OF THE INVENTION

According to one embodiment, the invention relates to a system that implements a framework that connects a plurality of complex forecasting components. The system comprises: a data store that stores datasets used as inputs to a plurality of forecasting components; a validation engine, comprising a computer processor coupled to the data store, that analyzes the datasets based on a plurality of rules and specifications and generates a report comprising an indication of compliance; a control processor that centralizes management of the plurality of forecasting components and run data and further orchestrates actions and events associated with each forecasting component; a plurality of agents, where each agent represents a connector that enables communication between each forecasting component and the framework; a plurality of composite agents, where each agent represents a process to run a combination of agents, decisions, calculations, interaction with external systems or logic; an application programming interface that allows control for one or more operations performed by the forecasting components; and a user interface that provides access control for one or more operations performed by the forecasting components.

In addition, there may be more than one user interface and the interfaces do not necessary need to be graphical. In general, the system may have a layer to provide interfaces by different channels.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. An embodiment of the present invention is directed to supporting activities of a company which rely on financial forecasting and further preserves a distributed and federated ecosystem where each component (or group of components) may be owned and managed independently. The innovative Framework may provide various functions including: maintaining metadata related to forecasting, maintaining audit trails, automating and managing the execution of the models and components, integrating different technologies and distributed systems, and providing a common central graphical user interface and programmatic interface which may be used to operate any step of the forecasting process. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Foundational Framework ("Framework") that integrates a multiplicity of calculators that may be executed, administered, and maintained in a distributed and federated manner. The Framework may represent an apparatus or system that connects a multiplicity of potentially very complex business models and data processing components, each of which produce different types of information related to financial forecasts, while maintaining a distributed and federated model to allow high autonomy to each component. The Framework may provide a unified and centralized operation of the lifecycle of each model and component. Moreover, the Framework enables the production of multiple unlimited types of forecasts of different dimensions and for different purposes using a common tool that coordinates and executes a sequence of components specific to a user, team and/or entity.

According to an embodiment of the present invention, the Framework may represent a hub that connects with interfaces associated with forecasting components and actors, including forecasting models implementations, data processors, data validators, data analysis modules, reporting tools, databases, data storage platforms, entitlement management systems and computing clusters, etc.

An embodiment of the present invention provides central and unified management of various combinations of forecasting components under a distributed and federated model. Each forecasting component may be owned by different teams at various levels including but not limited to design of inputs and outputs, design of the parameters that the component exposes to the users, selection of technologies, planning of development, management and operation of the infrastructure, and control of the release process.

Each component may be developed using different computer programming languages and/or tools, which the owner team may select and change autonomously at any time. Each component may follow a different development lifecycle process based in business and other requirements. For example, each component may have its own sets of input datasets, input setup parameters and output datasets. Notably, the Framework does not require predefined formats. Accordingly, the owners of each component may change the formats of the input and output datasets and maintain connectivity with the rest of the components.

The Framework may include a formal language to specify the input and output parameters of the forecast components, with flexibility for data types, datasets, metadata, connectivity between forecasting components. In addition, the Framework may be agnostic of the technology and infrastructure that each component requires. It may be flexible to interact with the components running in any type of networked server. The owners of the components may relocate and manage their components autonomously, which supports cloud computing patterns.

The nature of the environment may be intrinsically asynchronous because of the federated model and disparity in the forecast components which may take from a few seconds to many hours to complete depending on the component and the datasets used in each run. Each forecasting component may generate and receive multiple events during production of a forecast. The events may not always be the same for the same component and may include notifications and messages to users, milestones such as start/complete/fail, partial completion of the forecast, data ready for validation, publication/sharing results to other components and/or invalidation of results. The forecasts may be generated at different levels of granularity using the same component or different component. For example, the Framework may automatically connect the output of one component as the input of another one which has to be run after the first one was completed.

The graphical user interface may be rendered automatically based on component metadata and is further customizable by the component owners. The Framework may maintain in parallel a machine-to-machine programmatic interface that mimics and/or extends the user interface and allows automation of forecasts from external systems. To support the integration of the components and allow each owner to maintain and change their own dataset formats, the Framework may keep metadata which allows it to connect the components seamlessly.

Additionally, the graphical user interface is an exemplary view of the user interface. Text and/or voice based features may be added to provide additional channels of user interaction with the system.

The Framework may allow the user to select parameters and datasets that are validated, and further allow combinations that are consistent with the forecast. For example, it may need to assure that a loans portfolio snapshot and a macro economic scenario used in a forecast are time aligned, or that the forecast for a portfolio of prime mortgages uses the coefficients of the model which are trained for prime loans and not, for example, for subprime.

The Framework may manage multiple forecast runs in parallel for each component. To manage the computing resources, the Framework supports queueing and throttling features. The Framework may maintain queues of requests and run them when the conditions of the computing resources and the user settings are met.

An Audit trail may be used to replicate actions and/or events including: model changes, data changes, configuration changes of any calculator, without limiting the ability of the component owner to change their data and parameters definition at will.

The Framework may use an internal finite state machine to manage the dependencies of components for each different forecast use, granularity, dimension, and also to process asynchronous communication events between components.

The Framework may compile and maintain the metadata associated with each forecast at a component level holistically. The metadata may include finance aspects related to a macro economic scenario, assumptions, and actual data used as input. The metadata may also include the "meaning" of the forecast as what it represents, what are the conclusions, what purpose can it be used for, what are the granularity levels at which it can be used, etc. The management of the datasets may keep track of changes, as well as the validation of the contents. Connecting datasets that may be modified along time may require managing metadata and a mechanism that maps the different versions of a dataset type to each of the consumer components.

Figure 1:
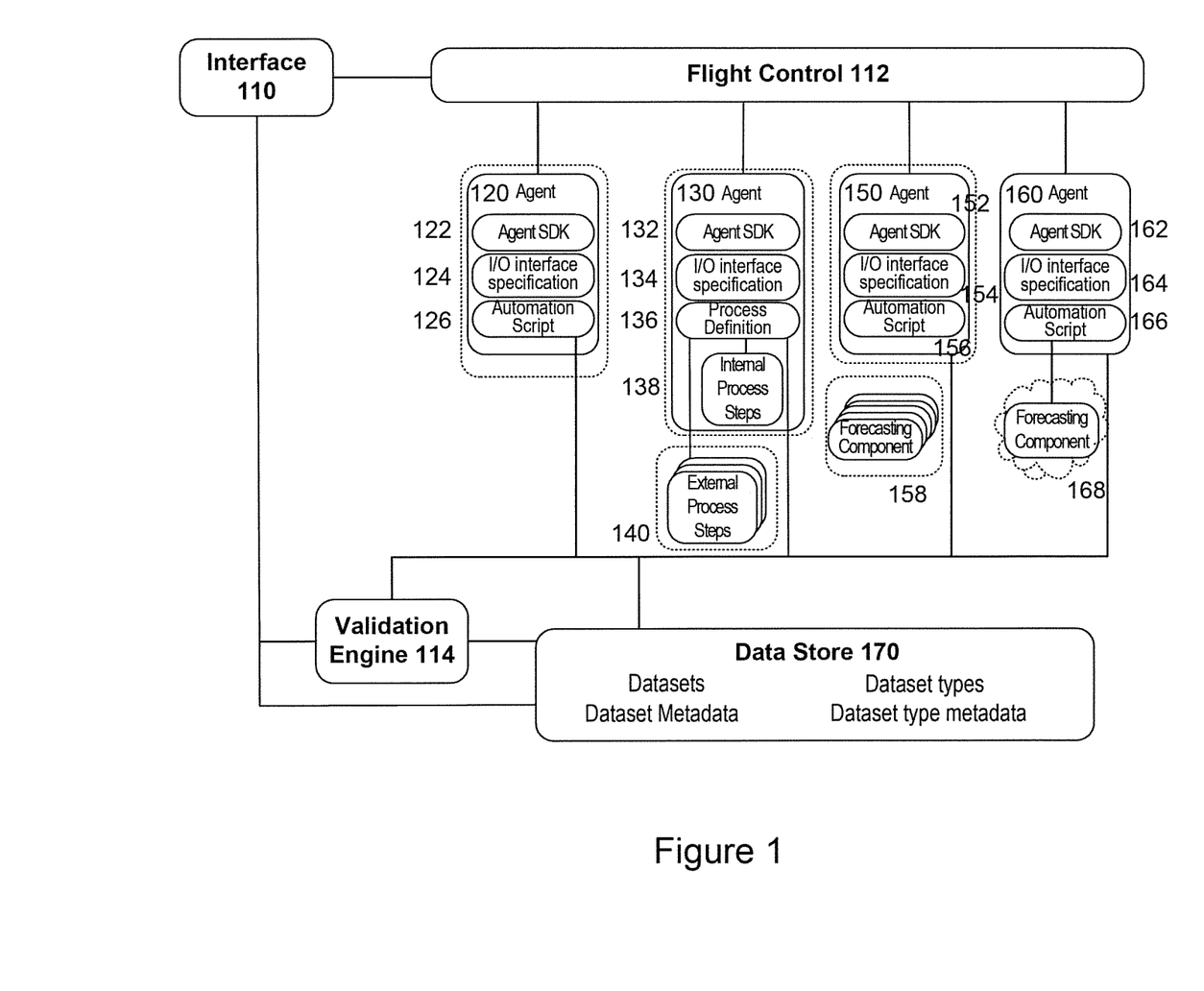
FIG. 1 is an exemplary system diagram of a framework, according to an embodiment of the present invention.

FIG. 1 is an exemplary system diagram of a framework, according to an embodiment of the present invention. FIG. 1 illustrates components of a Framework of an embodiment of the present invention. FIG. 1 shows Interface 110, Flight Control 112, Validation Engine (RIO) 114 and Datastore 170. Flight Control 112 may represent a processing component that manages execution of the various agents, represented by Aggregation Agent 120, Composite Agent 130, Agent 150 and Agent 160. Agent may represent a software component that performs a specified task. In addition, some agents such as a Composite Agent or an Aggregation Agent may have specialized functions. For example, Aggregation Agents may aggregate the output of other agents and then produce an additional forecast. Composite Agents may themselves invoke other agents following some logic. Aggregation Agent 120 may include Agent software development kit (SDK) 122, input/output (I/O) Interface Specification 124 and Automation Script 126. Composite Agent 130 may include Agent SDK 132, I/O Interface Specification 134, Process Definition 136, Internal Process Steps 138 and further interact with External Process Steps 140. Agent 130 may include Agent SDK 152, I/O Interface Specification 154, Automation Script 156 and further interact with Forecasting Component 158. Agent 160 may include Agent SDK 162, I/O Interface Specification 164, Automation Script 166 and may further interact with Forecasting Component 168.

Data Store 170 may represent a single or multiple data stores and storage components distributed across multiple locations. Data Store 170 may include Datasets, Dataset Metadata, Dataset Types and Dataset Type Metadata.

An embodiment of the present invention is directed to an innovative system that connects a multiplicity of potentially very complex forecasting component. The system may include a Data Store 170 that stores the datasets used as inputs of the components, the outputs generated by the components and the metadata that describes the datasets.

According to an embodiment of the present invention, Data Store 170 may include a Load Balancer, Application Programming Interface (API) and Distributed storage backend.

The Load Balancer may represent an equipment or a software component that distributes requests to access the Data Store across available Frontend Web Servers, to avoid overloading, to distribute the workload evenly or according to any other algorithm, and to prevent sending workload to any server which may eventually fail. For example, the Load Balancer may provide high availability through replication to provide resilience in case one of the equipment fails or is otherwise impaired.

With the Application Programming Interface (API), the system may expose operations using programmatic interfaces that may be run from remote systems which may include forecasting components, workstations and/or any other computer system that interacts with the forecasting data and/or metadata. In addition, the API may enforce access control restrictions.

Operations supported by the API may include registration of a hierarchy of namespaces for the management of the datasets. For example, the namespaces may be nested and represent entities related to the forecasts including but not limited to forecast components, forecast processes, forecast purposes, economic scenarios, forecast runs, etc.

In addition, operations may include various methods for reading data from any dataset in any format. This may include but is not limited to reading any version of a dataset, reading the full dataset, reading specific sections of the dataset, etc. Operations may include various methods for writing datasets in any format. This may include but is not limited to creating new datasets, creating new versions of an existing dataset, etc. The operation may apply to metadata. Another operation may include modifying the metadata of a dataset. The metadata associated with a dataset may be extensible by the users and include but is not limited to dataset type, dataset name, dataset data schema, mappings of the data to interconnection data models, user defined attributes for tagging the datasets, indications about the validation of the data, data archiving attributes, privacy attributes, permissions and access attributes.

Operation may include management of dataset types and their associated attributes and may further include create, modify, disable and enable operations. The dataset attributes may include but are not limited to data schema, validation rules, default access parameters and privacy attributes, mapping to interconnection data models, default visualization tools, etc. Another operation may include listing the contents of the Data Store and querying the metadata associated with the available datasets, applying any combination of filters including but not limited to dataset name, dataset type, attributes, etc. Another operation may include management of permissions including granting and revoking permissions to datasets, hierarchy, metadata, etc.

The API may apply authentication and authorization controls to operations, such as approving or rejecting the access to data and metadata. The API operations may be run using synchronous paradigms and protocols such as HTTP and HTTPS. In addition, the API operations may be run using asynchronous paradigms such as messaging based protocols, such as Advanced Message Queuing Protocol (AMQP), Java Message Service (JMS), etc.

Distributed storage backend may support the storage of the datasets as raw datafiles as well as structured formats, such as Hadoop Filesystem (RDFS). Distributed computing layer may support distributed execution of processing and queries on the datasets. Other operations may include modular execution of transformations and mappings of datasets, validation rule engine and structured access to the datasets including but not limited to filtering records, selecting columns, selecting dimensions, grouping data, etc.

An embodiment of the present invention is directed to a validation engine 114 that is responsible for the validation of the datasets and both inputs and outputs. Validation Engine 114 may represent a module that analyzes the datasets based on different types of rules and specifications and produces a report with details of the level of compliance of any dataset to them.

Validation Engine 114 may be modular and use different types of specifications and rules. For example, each module may be specialized to evaluate different language of rules definition, evaluate different types of datasets (e.g., records based, cubes, unstructured text, time series, etc.) and/or different aspects of the data (e.g., format, data consistency within a dataset, relations with other datasets, etc.).

For example, each validation module may be driven by one or more test-suite specifications and may further apply them to a dataset. Validation Engine 114 may retrieve the specifications as part of the metadata that is linked to either dataset types or the actual dataset in the Data Store.

A Schema based engine module may be specialized in the validation of the format and the data schema. Per dataset, a schema specification may be retrieved from the metadata registry. The schema specification may contain at least the mandatory columns and their data types (e.g., text, integer number, decimal number, date, etc.). Additional attributes per column may indicate if it is acceptable to have empty values, and optional validations as ranges for numbers (e.g., minimum and/or maximum). In addition, columns may be mandatory or optional. The Schema based engine may verify that the dataset complies to the schema specification, validating each of the columns existence and their data type and format.

With a Rule based engine module, a list of rules written in a language familiar to a business user may be executed for each record in a dataset. If the rule is not met, the validation fails for the given record. The rule language supports arithmetic, logical and aggregation/rollup operations over any combination of the columns present in the dataset.

With a Pluggable extensions module, new modules may be created by following a standardized interface that receives. Any generic specification format may be linked as metadata of the dataset or the dataset type, and kept in the Data Store or other location. A Validation Engine may implement a standard interface that receives the dataset to be validated, applicable specification and an execution context that provides the connectivity to the Framework system. The engine may run the validations against the dataset, retrieve additional data and metadata if required by using the context, and further return the validation report.

With reporting of errors, warnings and notices, the validation engine may produce a report for each file containing the results of applying the applicable modules and rules. Detailed information about each of the validations and each of the records that did not pass the tests may be provided. Each rule may be qualified with a severity level including error, warning and notice, including files with errors.

With a Programmatic Integration Interface, synchronous or asynchronous interaction may be supported for every operation. A Graphical User Interface (GUI) may expose features of the programmatic integration interface through a web application. For example, Interface 110 may be embedded in the main Framework UI.

As represented by Flight Control 112, an embodiment of the present invention may include a system that centralizes the management of component and run metadata, and further orchestrates the actions and events in every component.

According to an embodiment of the present invention, each Agent may represent a connector that enables a two way between any forecasting component and the rest of the Framework. Each agent may include an input interface, an output interface, automation script and agent SDK. For example, Agents may be represented by 120, 130, 150 and 160.

The Input interface may include configuration data that specifies input parameters to a forecasting component. This configuration may drive the generation of interfaces (e.g., graphical and integration) and data sourcing features such as validation. The specification may be generated using an specific forecasting component interface definition language.

The Output interface may include configuration data that specifies the output data that is generated by the component to enable advanced processing and connectivity in the Framework. The specification may be generated using a specific forecasting component interface definition language.

Automation script 126, 156 and 166 automates a forecast component start, and optionally other custom operations. It uses the API provided by the SDK to configure the forecasting module, run the production and upload the result datasets to the Framework. The script also notifies any relevant fail, warning or notice to the Framework, as well as summarized and/or detailed log records.

Agent SDK 122, 132, 152 and 162 may represent a software library that encapsulates the interaction with the framework and the application programming interface that supports the agent owner to customize how the component interacts with the Framework. Agent SDK may be implemented in multiple programming languages.

With a Background process, once started it becomes the link with the Framework. Agent SDK may interact synchronous and/or asynchronous and implement the operations of the framework including but not limited to startup registration, run component, cancel component, manage the runs queue, throttle the flow of component runs, run custom operations, send status updates to the Framework. With the API, operations published by the Framework that may be used by an agent developer to build the interaction between the forecasting component with the Framework including but not limited to receiving the input parameters of a run, down. The API may create an isolated environment to run each of the forecasts in parallel. Support tools may represent built in tools to automate operations such as start/stop the process, refresh the configuration, list runs, cancel runs, test connectivity.

According to an embodiment of the present invention, each Composite Agent may represent a forecasting process and its steps; optionally may contain an implementation of computing logic of one or more of the process steps. The composite agent process enables a two way between the forecasting process and the rest of the Framework. Each agent may include an input interface, an output interface, forecasting process definition, forecasting process steps definition, and optionally the necessary logic to implement process steps. Process and steps may use agent SDK or other methods to interact with the rest of the framework.

Composite Agents may run as standalone processes or as part of a Flight Control orchestration component.

The forecasting processes in Composite Agents may be used to manage series of more granular interrelated forecasting tasks. The process tasks may include various combinations of actions such as execution of other agents or forecasting components, calculations, interaction with systems (inside or outside the framework), conditional branching, parallelization, flow control, notifications, and others.

Forecast processes in Composite Agents may include tasks which require the execution of agents to discover dependencies between tasks and automatically connect inputs and outputs as required by the tasks. The behavior may be overridden and/or modified by user configuration.

The forecasting process may be dynamically amended during the execution of each of its instances based on input parameters, configuration, interaction with other framework components, automatic discovery of task dependencies, or in general any other data source. Amendments may include adding or removing tasks, modifying task dependencies, modifying data.

Graphical User Interface provides access control where an operation may be allowed based on the configuration of the entitlements system. A Validation Engine Frontend may provide access to the Validation Engine. The Graphical User Interface may run forecasts and run a calculator based on the specification of the calculator required parameters, which may include single forecast mode, batch forecast mode and/or other modes.

The Graphical User Interface may enable a user to monitor and browse available forecast runs. Other operations may include: view the runs that are in progress and finished; view run parameters and milestone messages, view notifications, access to the result datasets and logs, view audit trail, export configuration, create new forecast using an existing one as template.

With the Graphical User Interface, users may manage the contents of the Data Store. Other operations may include: browse contents of the Data Store, view the history and audit trail of each dataset and metadata, browse metadata, modifications of the metadata, copy input datasets, and other actions supported by the Data Store. Users may also manage the configuration, rules, process, permissions, resource allocation and other parameters associated to agents and/or composite agents via the Graphical User Interface. Further operations may include: forecast lifecycle actions include sign off forecasts and publishing them as available for other forecast components, flag forecasts as containing errors, cancel in progress processes. Additional operations may include: annotate the metadata of the forecast: meaning of the forecast, granularity level, purposes that it can be used for; reporting (access to reports); and analytics (e.g., access to analytic tools for forecast and/or input datasets).

An embodiment of the present invention may include Forecasting model calculators. The calculators may run in any computer programming language and may be monolithic or distributed in servers or further run in the cloud. Forecast model calculators may combine multiple forecasting software modules under the same interaction. The calculators may use any startup and configuration interface including but not limited to software library, external command, database table, web service, asynchronous message, scheduler software, etc. The calculators may consume and generate results using any method including but not limited to files, database tables, asynchronous messaging.

Aggregation agents may aggregate multiple forecasts to generate consolidated forecasts.

Reporting and analytic components may process the output of one or more forecasts to feed data into reporting tools or analytic tools. These components may also run analytics that generate additional data to support processes, such as data mining, finding anomalies, and comparing forecasts.

User tools may include software tools available to the users to automate and assist the interaction with the Framework. Exemplary tools may include upload/download of datasets, export of metadata with filters, comparison of parametrization of forecasts, and batch runs of forecasts.

Figure 2:
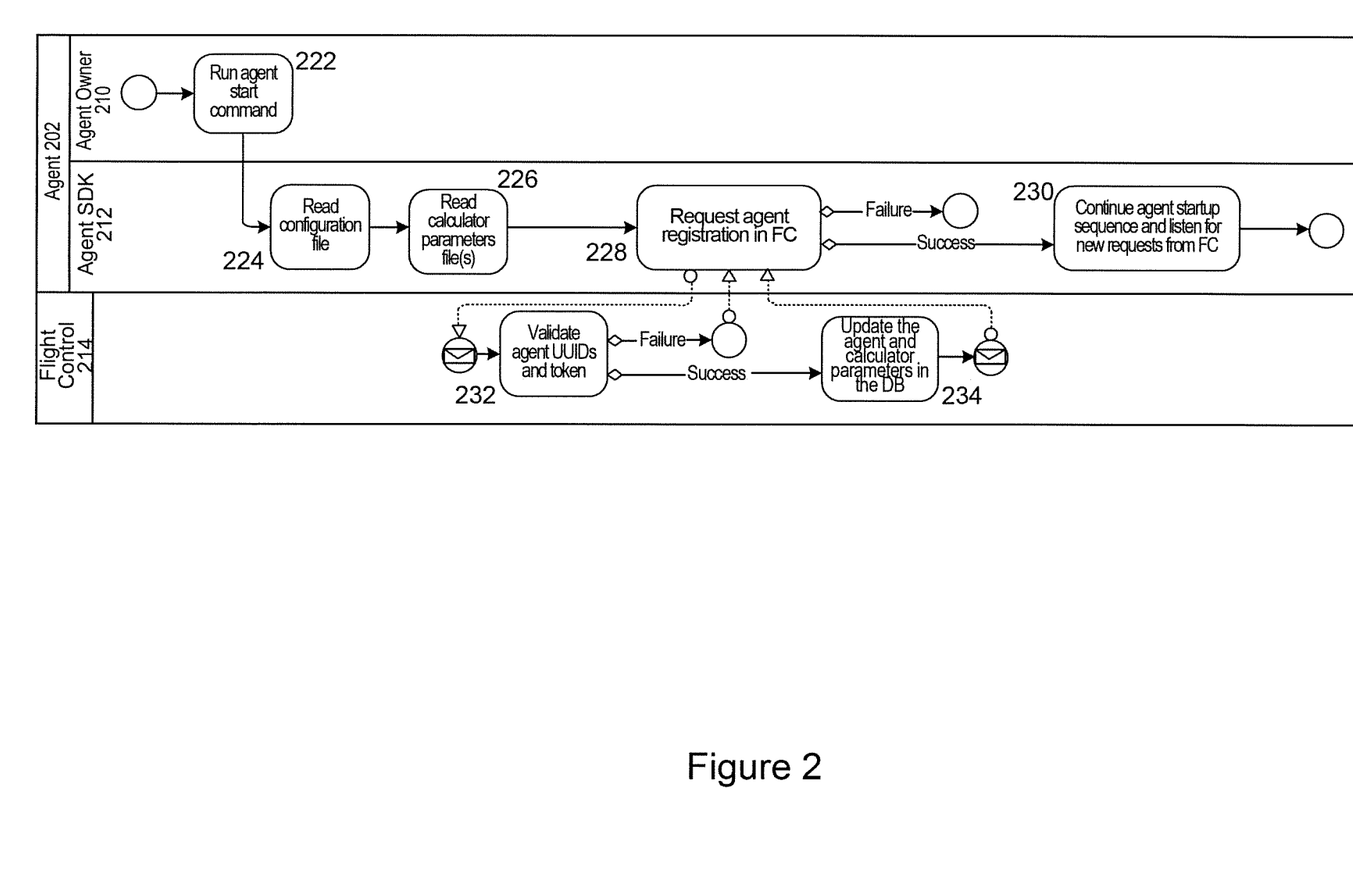
FIG. 2 is an exemplary startup registration of a framework component, according to an embodiment of the present invention.

FIG. 2 is an exemplary startup registration of a framework component, according to an embodiment of the present invention. FIG. 2 illustrates interactions between Agent 202 (specifically Agent SDK 212 and Agent Owner 210) and Flight Control 214. At 222, agent start command may run. Agent SDK may read a configuration file at 224 and a calculator parameter file(s) at 226. Agent SDK 212 may request agent registration in Flight Control (FC) at 228. At step 230, agent startup sequence may continue and listen for new requests. Flight Control may validate the agent universal unique identifier (UUID) and token at 232. If the validation is a success, the agent and calculator parameters may be updated in the database, at 234.

Figure 3:
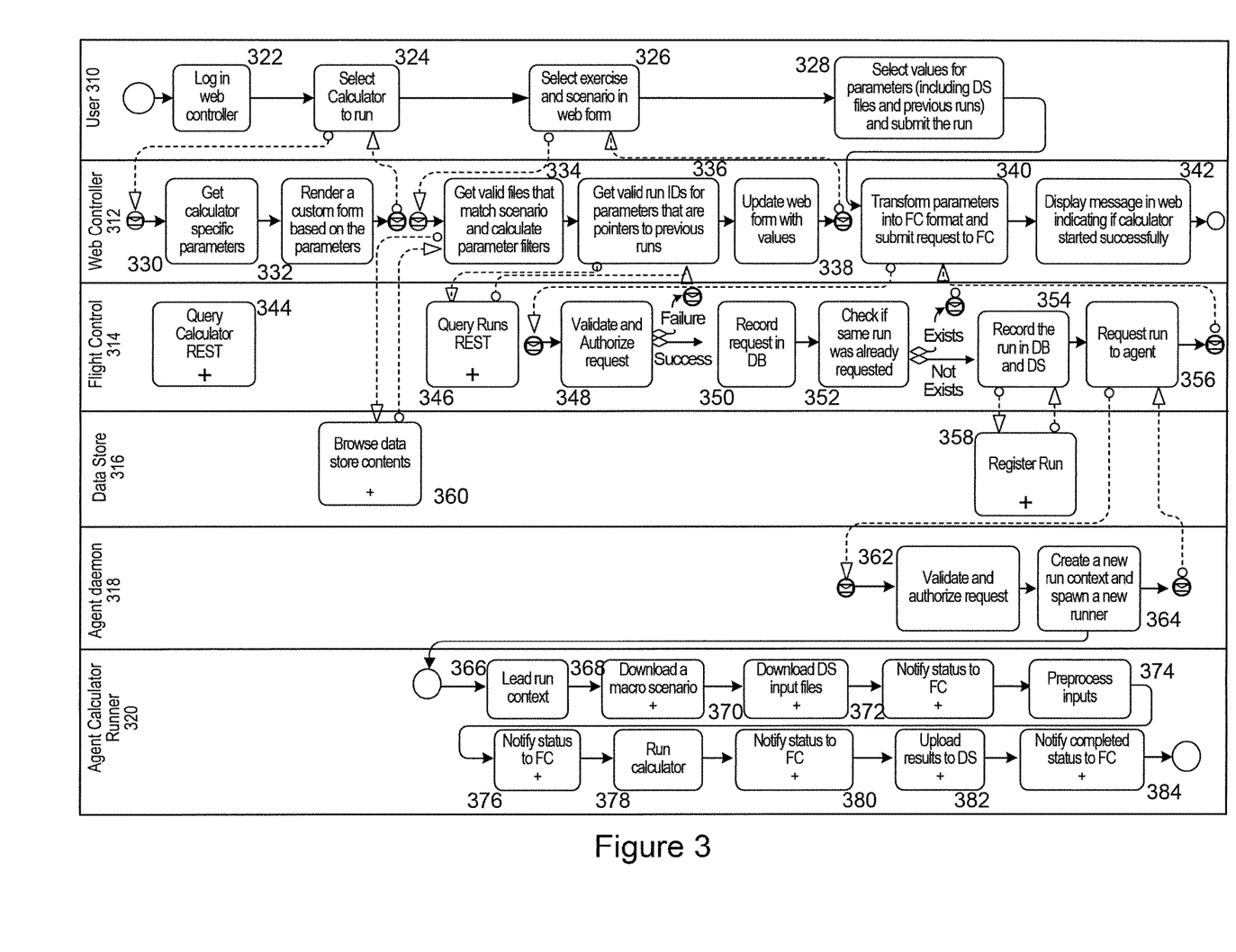
FIG. 3 is an exemplary illustration of configuring and running a forecast component, according to an embodiment of the present invention.

FIG. 3 is an exemplary illustration of configuring and running a forecast component, according to an embodiment of the present invention. FIG. 3 illustrates a calculator flow. FIG. 3 illustrates interactions between and among User 310, Web Controller 312, Flight Control 314, Data Store 316, Agent Daemon 318 and Agent Calculator Runner 320. At 322, the user may log in the web controller. At 324, the user may select a calculator to run. At 326, the user may select an exercise and scenario. At 328, the user may select values for parameters.

Web Controller 312 may retrieve calculator specific parameters. At 332, web controller may render a custom form based on the parameters. At 334, web controller may retrieve valid files that match the scenario and calculator parameter filters. At 336, web controller may retrieve valid run IDs for the parameters that are pointers to previous runs. At 338, web form may be updated with the values. At 340, web controller may transform the parameters into FC format and submit the request to the FC. At 342, web controller may display a message.

Flight Control 314 may execute a query calculator REST at 344. At 346, query may run REST. At 348, flight control may validate and authorize the request. At 350, flight control may record the request in the database. At 352, flight control may check if the same run was already requested. At 354, flight control may record the run in the database and the Data Store (DS). At 356, flight control may request the run to the agent.

Data Store 316 may browse data and store contents at 360 and register run at 358.

At 362, Agent Daemon 318 may validate and authorize the request and create a new run context and spawn a new runner at 364. The runner process is spawned and disconnected from the agent daemon. The agent daemon responds to FC without waiting for the runner to finish. Using the context and the agent SDK the runner is autonomous to interact with FC.

Agent Calculator Runner 320 may lead a run context, at 366 and download a macro scenario at 368. Agent Calculator Runner 320 may download DS input files, at 370, notify status to FC, at 372, preprocess inputs at 374, notify status to FC at 376, run calculator at 378, notify status to FC at 380, upload results to DS at 382 and notify completed status to FC at 384. This is a sample sequence that represents what a runner looks like. There are no constraints enforced to the runner flow, just recommendations. The boxes with the "+" sign represent functions available as part of the agent SDK.

Figure 4:
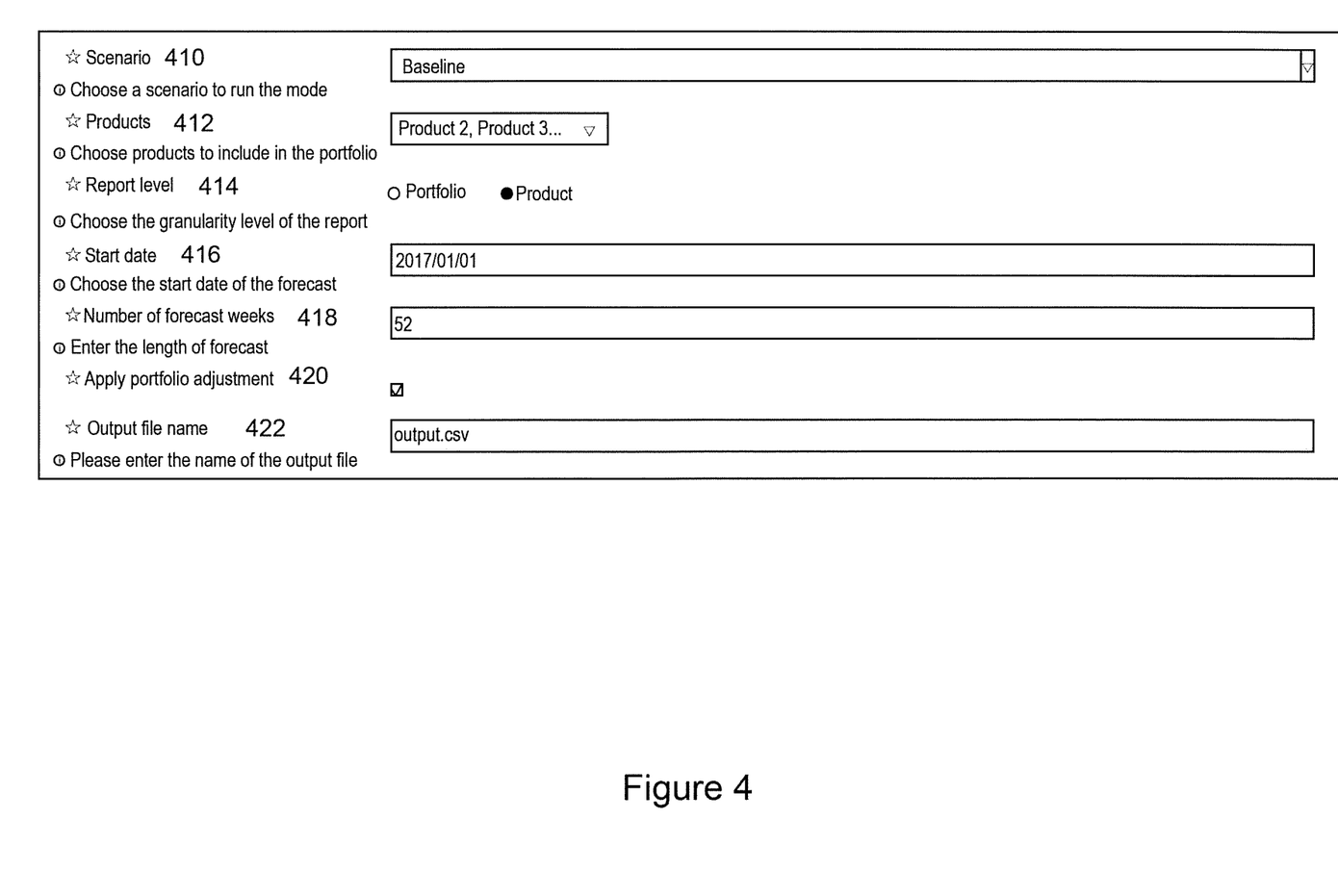
FIG. 4 is an exemplary interface illustrating static parameter input examples, according to an embodiment of the present invention.

FIG. 4 is an exemplary interface illustrating static parameter input examples, according to an embodiment of the present invention. FIG. 4 illustrates an input that provides Scenario 410, Products 412, Report Level 414, Start Date 416, Number of Forecast Weeks 418, Portfolio Adjustment 420 and Output File Name 422.

At Scenario 410, a user may select a scenario to run the mode. At Products 412, a user may select one or more products. At step 414, the user may select a report level that identifies a granularity level, such as portfolio, product, etc. A user may provide a date input at Start Date 416, a number of forecast weeks at 418, portfolio adjustment at 420. An output file may be identified at 422.

Figure 5:
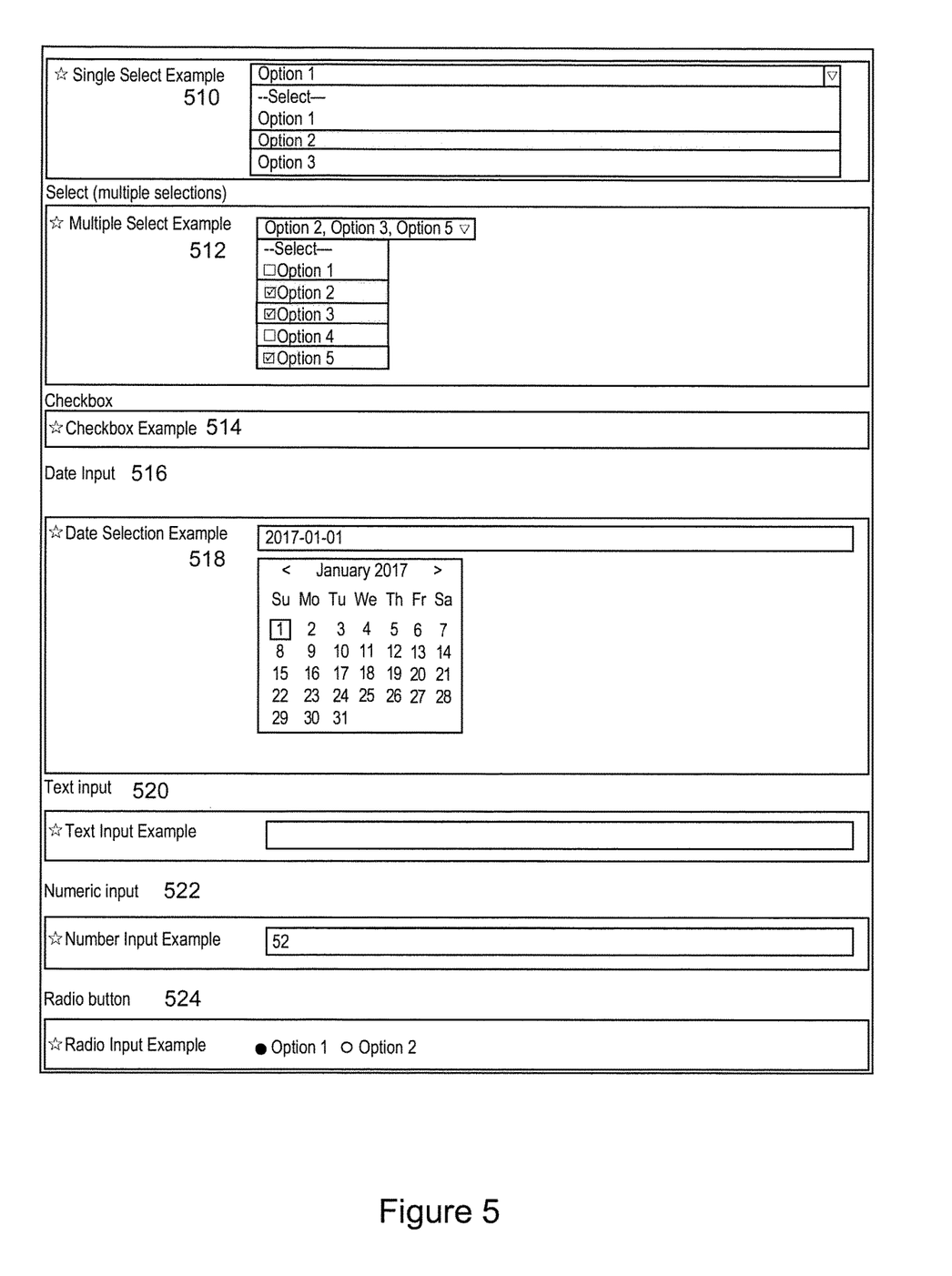
FIG. 5 is an exemplary interface illustrating individual inputs, according to an embodiment of the present invention.

FIG. 5 is an exemplary interface illustrating individual inputs, according to an embodiment of the present invention. FIG. 5 illustrates an input for Single Select Example 510, Multiple Select Example 512, Checkbox 514, Date Input 516, Text Input 520, Numeric Input 522 and Radio Button 524.

Figure 6:
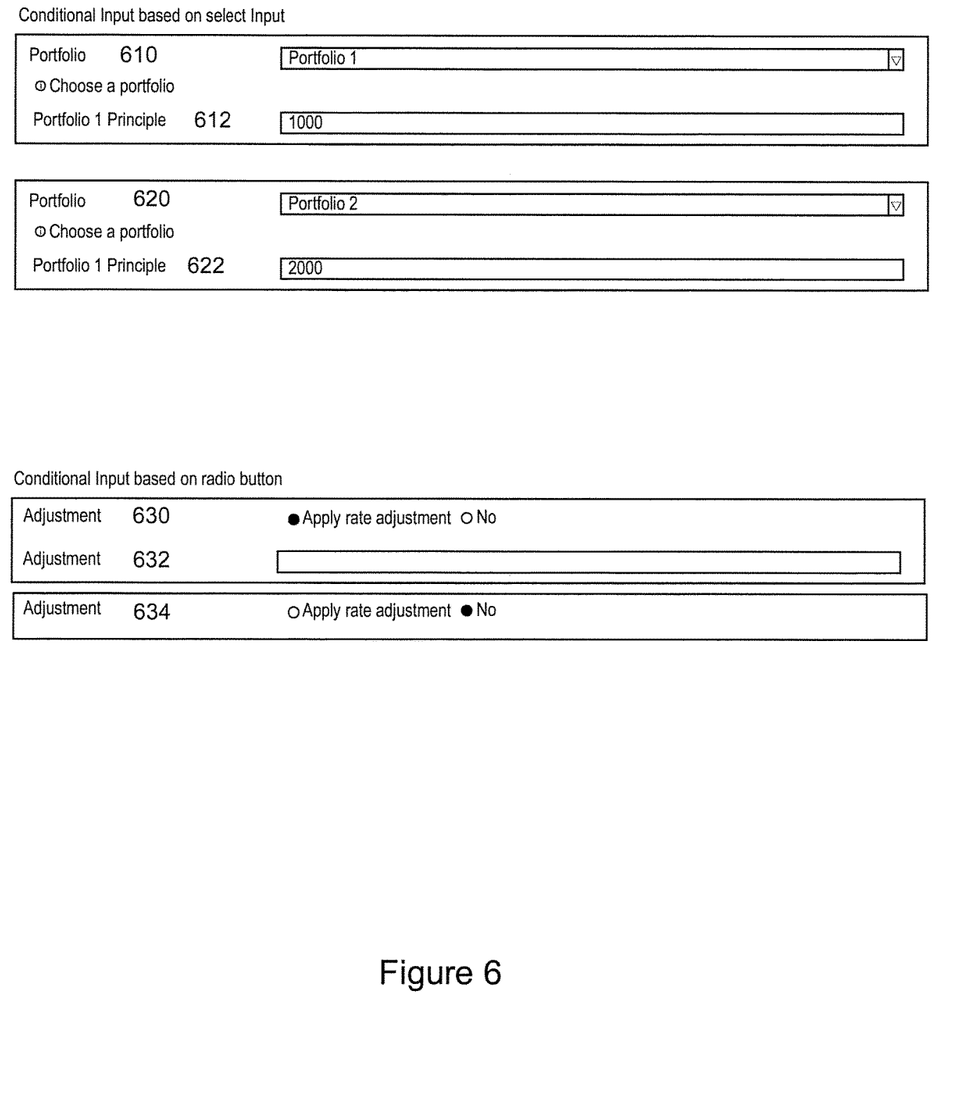
FIG. 6 is an exemplary interfaces illustrating conditional parameters, according to an embodiment of the present invention.

FIG. 6 is an exemplary interfaces illustrating conditional parameters, according to an embodiment of the present invention. FIG. 6 illustrates an input for Portfolio 1 610, Portfolio Principle 1 612, Portfolio 2 620 and Portfolio 2 Principle 622. Conditional Inputs may include Adjustments 630, 632 and 634.

Figure 7:
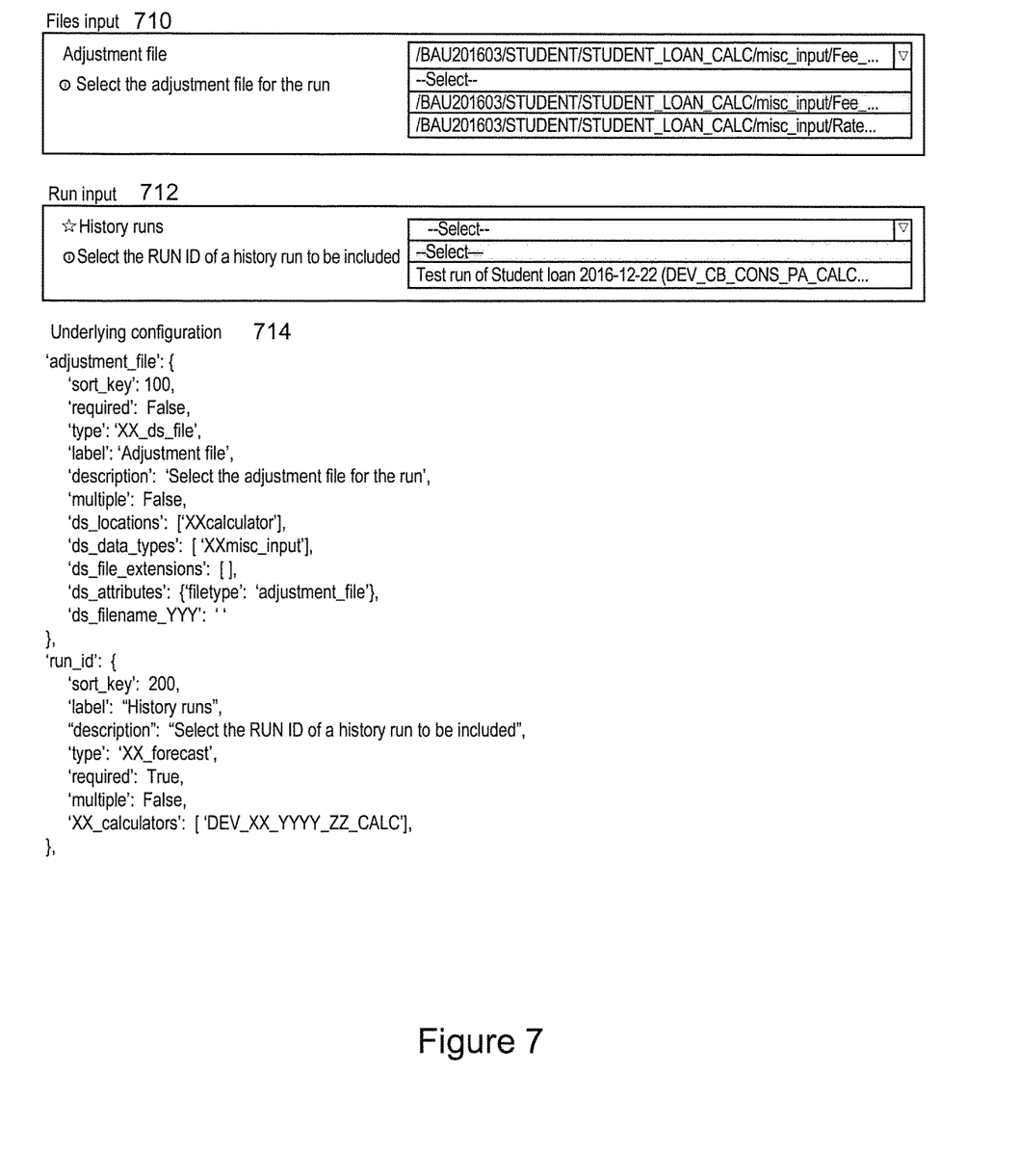
FIG. 7 is an exemplary interfacing illustrating files input and run input, according to an embodiment of the present invention.

FIG. 7 is an exemplary interfacing illustrating files input and run input, according to an embodiment of the present invention. Files Input may be shown at 710 and Run input may be shown at 712. Underlying Configuration may be shown at 714.

Figure 8:
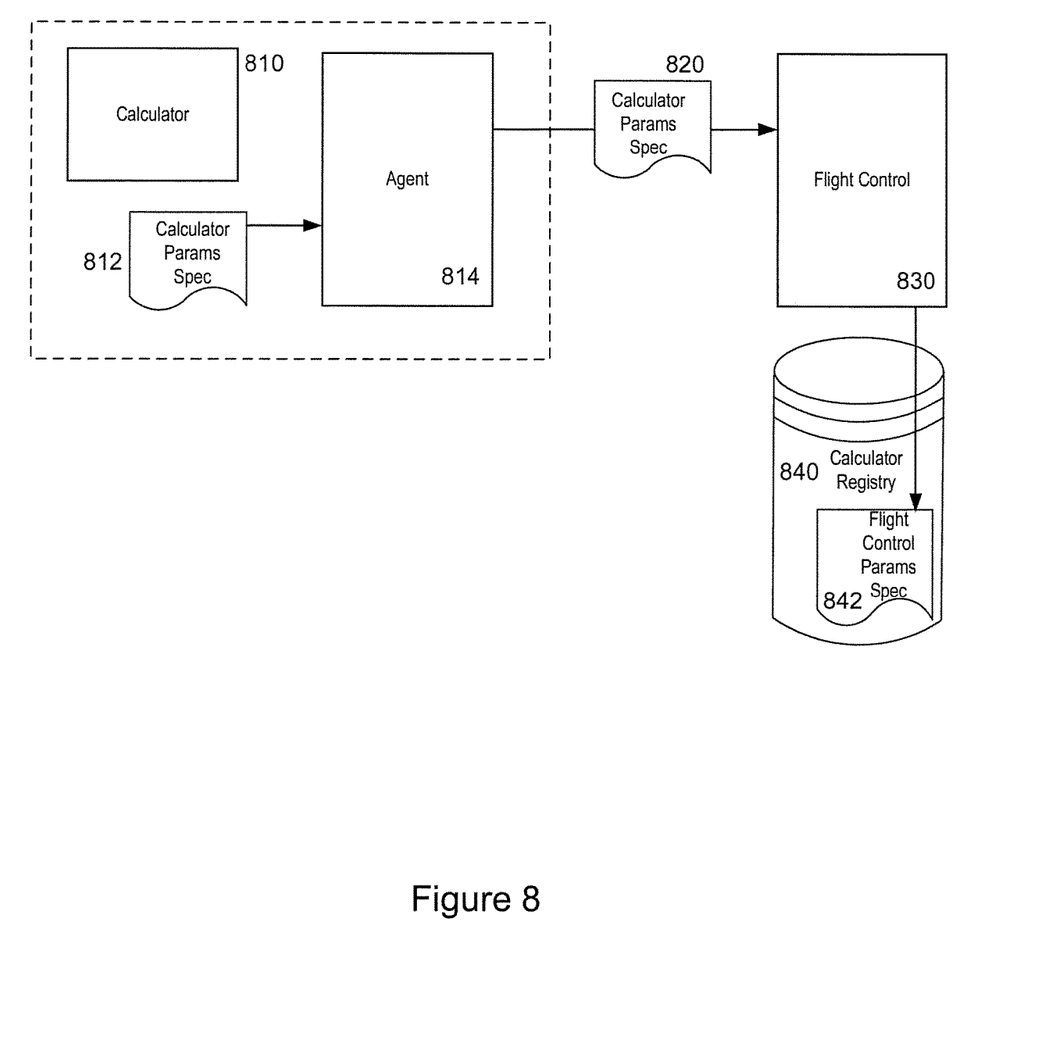
FIG. 8 is an exemplary illustration of calculator parameters registration diagram, according to an embodiment of the present invention.

FIG. 8 is an exemplary illustration of calculator parameters registration diagram, according to an embodiment of the present invention. FIG. 8 illustrates Calculator 810, Calculator Parameter Spec 812 and Agent 814. Agent 814 may transmit Calculator Parameter Spec 820 to Flight Control 830, which then stores Flight Control Parameter Spec 842 at Calculator Registry 840.

Figure 9:
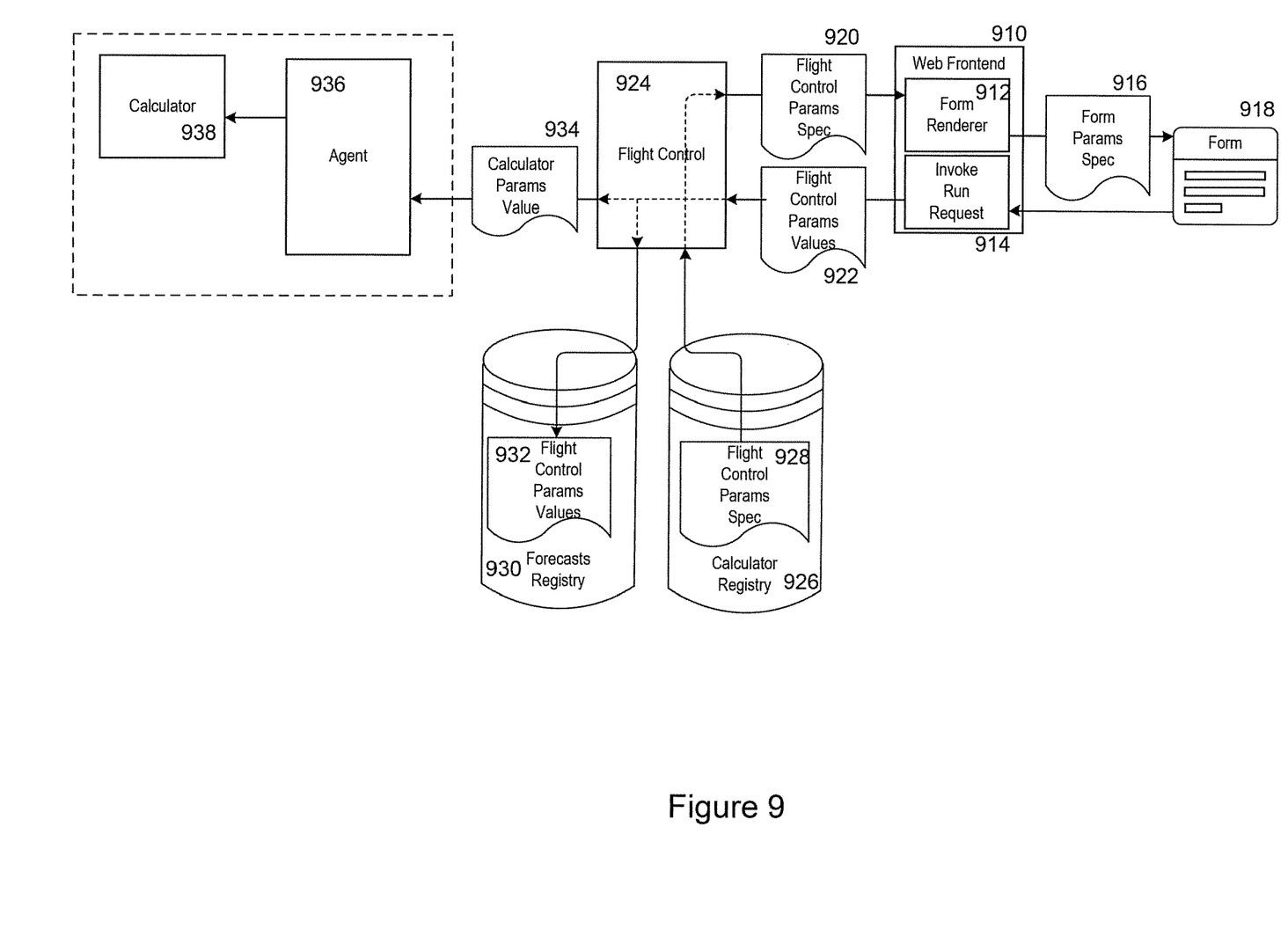
FIG. 9 is an exemplary illustration of component parameters and submission of a configuration to run a forecast, according to an embodiment of the present invention.

FIG. 9 is an exemplary illustration of component parameters and submission of a configuration to run a forecast, according to an embodiment of the present invention. FIG. 9 illustrates Web Frontend 910 with Form Renderer 912 and Invoke Run Request 914. Form Parameter Spec 916 may be communicated to Form 918. Web Frontend 910 may receive Flight Control Parameter Spec 920 and transmit Flight Control Parameter Values 922 to Flight Control 924. Flight Control 924 may access data from Flight Control Parameter Spec 928 stored in Calculator Registry 926 and store data including Flight Control Parameter Values 932 to Forecasts Registry 930. Flight Control 924 may transmit Calculator Parameter Value 934 to Agent 936 and to Calculator 938.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a framework that connects a plurality of complex forecasting components, the system comprising:
a data store that stores datasets used as inputs to a plurality of forecasting components;
a validation engine, comprising a computer processor coupled to the data store, that analyzes the datasets based on a plurality of rules and specifications and generates a report comprising an indication of compliance;
a control processor that centralizes management of the plurality of forecasting components and run data in a hub structure, the centralizing comprising:
registering the plurality of forecasting components, each forecasting component developed in one of a plurality of computer programming languages;
employing a formal language to specify one or more input and output parameters of the plurality of forecasting components;
compiling and maintaining metadata for each of the plurality of forecasting components, the metadata comprising information about forecast data output by each forecasting component including a programming language and any changes to a data type or a data format over time;
connecting the plurality of forecasting components through the formal language, based on the metadata;
queueing a plurality of forecast runs based on the plurality of forecasting components, and throttling the flow of the plurality of forecast runs and sending status updates to the framework;
running the queued plurality of forecast runs when one or more conditions of computing resources and one or more user settings are satisfied;
an application programming interface that allows control for one or more operations performed by the forecasting components, and further facilitates forecasting component integration;
a plurality of agents, where each agent represents a connector that enables communication between each forecasting component and the framework through the hub structure and application programming interface, and with the formal input and output language established by the control processor;
a plurality of composite agents, where each composite agent represents a process to run a combination of agents, decisions, calculations, interaction with external systems or logic; and
a user interface that provides access control for one or more operations performed by the forecasting components.

2. The system of claim 1, wherein the data store comprises a load balancer, a distributed storage backend and a distributed computing layer.

3. The system of claim 1, further comprising: a plurality of forecasting model calculators.

4. The system of claim 1, further comprising: a plurality of aggregation agents that aggregate multiple forecasts to generate a consolidated forecast.

5. The system of claim 1, wherein each composite agent represents a forecasting process.

6. The system of claim 5, wherein each composite agent enables a two way communication between the forecasting process and the framework.

7. The system of claim 5, wherein the forecasting process is dynamically amended.

8. The system of claim 1, wherein the composite agent manages a series of interrelated forecasting tasks.

9. The system of claim 1, wherein each composite agent comprises an input interface, an output interface, a forecasting process definition and forecasting process steps definition.

10. The system of claim 1, wherein the user interface enables a user to manage configuration, rules, permissions, resource allocation associated with agents and composite agents.

11. The system of claim 1, wherein the load balancer distributes a plurality of requests to the data store across a plurality of frontend web servers.

12. The system of claim 1, wherein the application programming interface enforces access control restrictions.

13. The system of claim 1, wherein the application programming interface applies authentication and authorization controls to approve and reject access to data and metadata stored in the database.

14. The system of claim 1, wherein the data store stores datasets and dataset metadata.

15. The system of claim 1, wherein the data store stores dataset types and dataset type metadata.

16. The system of claim 1, wherein the data store represents a Hadoop file system.

17. The system of claim 1, wherein the validation engine further comprises a schema based engine specialized in validation of a specific format and data schema.

18. The system of claim 1, wherein the validation engine further comprises a rules based engine.

19. The system of claim 1, wherein the validation engine further comprises a forecasting model calculator.

20. The system of claim 1, wherein the plurality of composite agents aggregate a plurality of forecasts to generate a consolidated forecast.

* * * * *